United States Patent
Kawaragi

(10) Patent No.: US 12,022,034 B1
(45) Date of Patent: Jun. 25, 2024

(54) OPERATION DEVICE AND DISPLAY METHOD

(71) Applicant: Toshiba Tec Kabushiki Kaisha, Tokyo (JP)

(72) Inventor: Akira Kawaragi, Ito Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/189,680

(22) Filed: Mar. 24, 2023

(51) Int. Cl.
- G06F 3/12 (2006.01)
- G06F 9/30 (2018.01)
- G06F 11/07 (2006.01)
- G06F 16/955 (2019.01)
- H04N 1/00 (2006.01)

(52) U.S. Cl.
CPC ..... H04N 1/00344 (2013.01); G06F 11/0733 (2013.01); G06F 16/9554 (2019.01); H04N 1/00037 (2013.01)

(58) Field of Classification Search
CPC ............ H04N 1/00344; H04N 1/00037; G06F 11/0733; G06F 16/9554; G06F 11/00; G06F 3/1229; G06F 3/1234; G03G 15/5016
See application file for complete search history.

(56) References Cited

U.S. PATENT DOCUMENTS

| | | | |
|---|---|---|---|
| 8,040,542 B2 | 10/2011 | Oda et al. | |
| 2010/0115348 A1* | 5/2010 | Gilluwe | G06F 16/24 715/733 |
| 2011/0075192 A1* | 3/2011 | Kumamoto | G06F 3/121 358/1.15 |
| 2012/0317480 A1* | 12/2012 | Onishi | H04N 1/00344 715/273 |
| 2016/0140099 A1* | 5/2016 | Yoshikawa | G06F 3/12 715/224 |
| 2020/0344361 A1* | 10/2020 | Nakaiwa | H04N 1/00334 |
| 2023/0090804 A1* | 3/2023 | Ishihara | G06F 3/1288 358/1.15 |

FOREIGN PATENT DOCUMENTS

| | | |
|---|---|---|
| JP | H10-177325 A | 6/1998 |
| JP | 2007-041840 A | 2/2007 |
| JP | 2010-107571 A | 5/2010 |

* cited by examiner

Primary Examiner — Iriana Cruz
(74) Attorney, Agent, or Firm — FOLEY & LARDNER LLP

(57) ABSTRACT

A system includes a processing circuit and a display device. The processing circuit is configured to detect an error in the system and control the display device to display a code symbol including a uniform resource locator (URL) for a page that provides a display of one or more services related to the error based on detection of the error.

19 Claims, 7 Drawing Sheets

OPERATION DEVICE AND DISPLAY METHOD

FIELD

Embodiments described herein relate generally to an operation device and a display method.

BACKGROUND

In some cases, a multifunction peripheral (MFP) may generate an error requiring coping (e.g., remedial) measures by a service person. After confirming an occurrence of an error in the MFP, a user contacts a service center by phone, e-mail, or the like, and requests the service center to take coping measures by the service person. However, the user is required to look up the contact of the service center such as a phone number or e-mail address before contacting the service center.

DETAILED DESCRIPTION

In a situation as described above, if a service person copes with an error in an MFP, the service person may search the service manual for coping measures of the error in the MFP based on an error code. However, before going to the installation site of the MFP, a service person may need to consult a service manual including content describing the error in the MFP.

For this reason, there is a demand for simplifying coping measures of one or both of the user and the service person to eliminate the error.

In general, according to one embodiment, an operation device includes a processing circuit and a display device. The processing circuit detects an error in the operation device. The display device displays code symbols recording URLs of pages containing a display of one or more services related to the error based on detection of the error by the processing circuit.

Hereinafter, embodiments will be described with reference to the drawings. It is noted that the scale of each portion of each figure used for the description of the following embodiments may be changed as appropriate. In addition, in each figure used for the description of the embodiments below, some configurations may be omitted for the sake of description.

Figure 1:
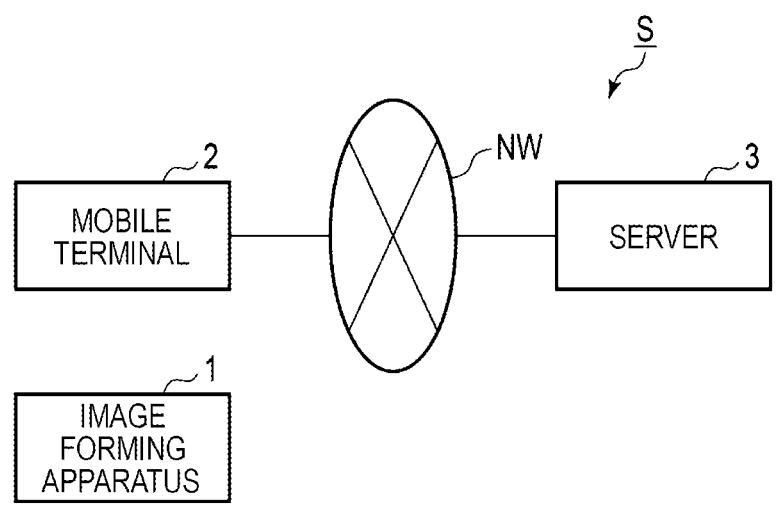
FIG. 1 is a block diagram schematically illustrating a configuration example of a processing system according to an embodiment.

FIG. 1 is a block diagram schematically illustrating the configuration example of a processing system S. The processing system S includes an image forming apparatus 1, a mobile terminal 2, and a server 3. The mobile terminal 2 and the server 3 are communicably connected to each other via a network NW. The network NW includes one or more of various networks such as the Internet, a mobile communication network, and a local area network (LAN). The LAN may be a wireless LAN or a wired LAN. Although FIG. 1 illustrates one image forming apparatus 1, the processing system S can include the plurality of image forming apparatuses 1. Although FIG. 1 illustrates one mobile terminal 2, the processing system S may include the plurality of mobile terminals 2. The processing system S may also denote a system that includes at least two devices.

The image forming apparatus 1 is an apparatus having a printing function. The printing function includes forming an image. The images include not only characters but also patterns and the like. For example, the image forming apparatus 1 is a MFP, but the embodiment is not limited thereto. The image forming apparatus 1 is an example of a printing apparatus having a printing function. The printing apparatus is an example of the operation device that performs various operations. The operation includes motion. The operations include processes such as computations that do not involve the motion. A configuration example of the image forming apparatus 1 will be described later.

The mobile terminal 2 is a portable apparatus having a communication function. For example, the mobile terminal 2 is a smart phone, a tablet terminal, or the like, but the embodiment is not limited thereto. The mobile terminal 2 is an example of a communication terminal having a communication function. A configuration example of the mobile terminal 2 will be described later.

The server 3 is an apparatus having an information processing function. The server 3 is a server that provides pages about the image forming apparatus 1. The server 3 is an example of an information processing apparatus having the information processing function. A configuration example of the server 3 will be described.

For example, the page is a web page. The page for the image forming apparatus 1 has a page containing a display of one or more services related to an error in the image forming apparatus 1. For example, the error in the image forming apparatus 1 is an error that occurred in the image forming apparatus 1. The error is a defect with the image forming apparatus 1 such that the image forming apparatus 1 cannot operate normally. Herein, it is assumed that the error requires coping measures of a service person. The error may be a hardware error or may be a software error. The service person is a person coping with the error in order to eliminate the error in the image forming apparatus 1. The coping measures include countermeasures. Hereinafter, the page including the display of one or more services related to the error in the image forming apparatus 1 is also referred to as a page related to the error. The page related to the error is a page related to the coping measures to the error. For example, the coping measures to the error are the coping measures to eliminate the error. The coping measures to the error can include the coping measures of the user of the image forming apparatus 1 to address the error. The coping measures to the error can include the coping measures of the service person to address the error. For example, the coping measures of the service person to address the error is maintenance. The coping measures of the service person to address the error are also referred to as a service call.

The one or more services related to the error may include the service for contact by phone. The contact by phone is the contact by the user of the image forming apparatus 1 to the service center. The contact by phone includes a request of the user of the image forming apparatus 1 for the coping measures of the service person to the error by phone to the service center. The contact by phone is an example of the coping measures of the user of the image forming apparatus 1 to address the error. For example, the service center is a service center that receives the coping measures of the service person. The service center is an example of the coping measures destination of the contact.

The one or more services related to the error may include a service to the contact by e-mail. The contact by e-mail is the contact by the user of the image forming apparatus 1 to the service center by e-mail. The contact by e-mail includes a request of the user of the image forming apparatus 1 for the coping measures of the service person to the error by e-mail to the service center. The contact by e-mail is an example of the coping measures of the user of the image forming apparatus 1 to address the error.

The one or more services related to the error can include a service for browsing of an electronic manual for the image forming apparatus 1. The browsing of the electronic manual is the browsing of the electronic manual by the service person. The browsing of the electronic manual includes the browsing of the electronic manual for the service person to cope with the error. The browsing of the electronic manual is an example of the coping measures of the service person to address the error.

As described above, the one or more services related to the error can include one or more services for the coping measures of the user of the image forming apparatus 1 to address the error and one or more services for the coping measures of the service person to address the error. It is noted that the one or more services related to the error may include one or more services for the coping measures of the user of the image forming apparatus 1 to address the error and may not include one or more services for the coping measures of the service person to address the error. The one or more services related to the error may include one or more services for the coping measures of the service person to address the error and may not include one or more services for the coping measures of the user of the image forming apparatus 1 to address the error.

Figure 2:
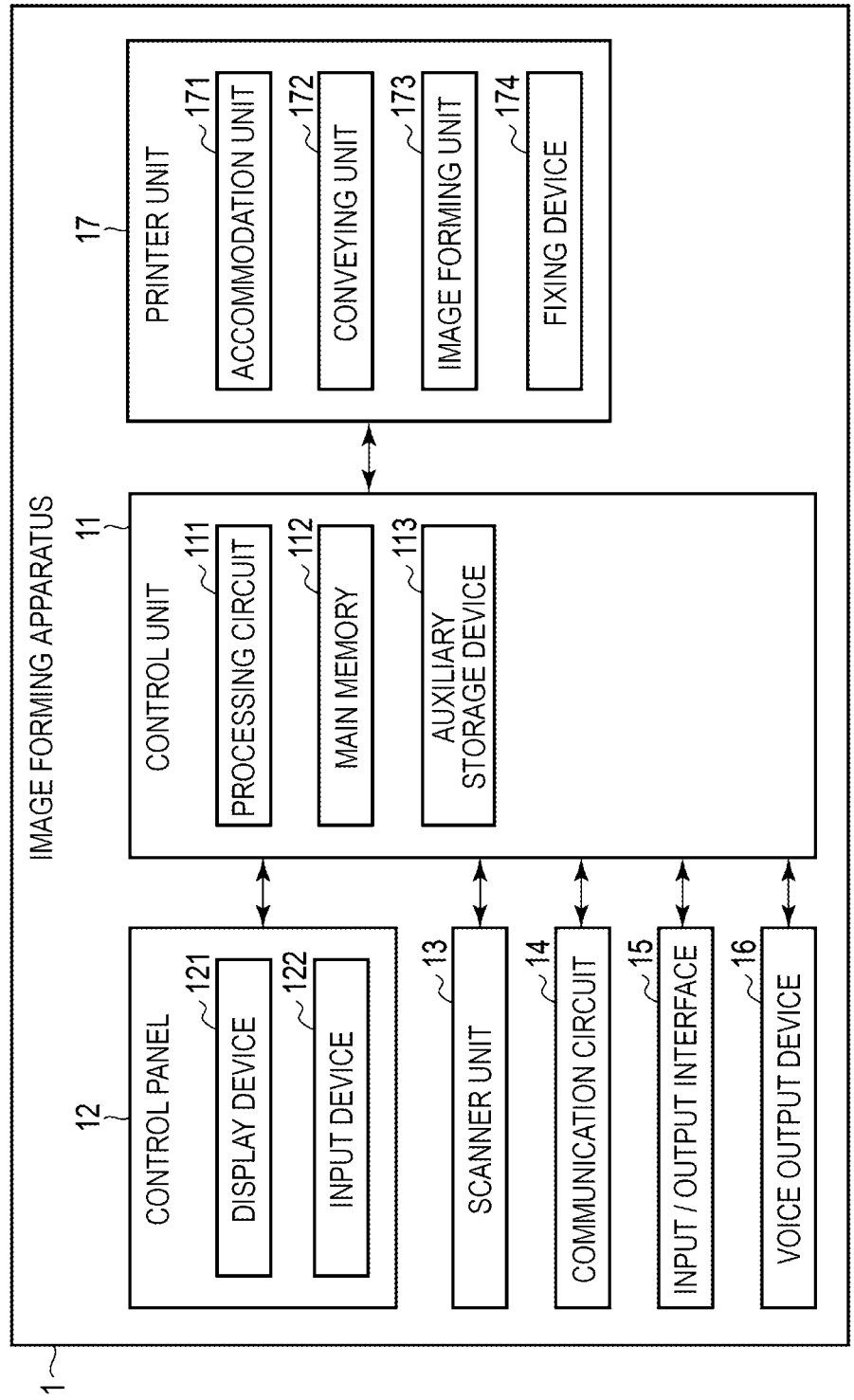
FIG. 2 is an external view schematically illustrating a configuration example of an image forming apparatus.

A configuration example of the image forming apparatus 1 will be described. FIG. 2 is a block diagram schematically illustrating the configuration example of the image forming apparatus 1. The image forming apparatus 1 includes a control unit 11 (a controller, a control system, etc.), a control panel 12, a scanner unit 13 (a scanner), a communication circuit 14, an input/output interface 15, a voice output device 16, and a printer unit 17 (a printer).

The control unit 11 controls operations of each component of the image forming apparatus 1. The control unit 11 includes a processing circuit 111, a main memory 112, and an auxiliary storage device 113.

The processing circuit 111 corresponds to a central portion of the image forming apparatus 1. The processing circuit 111 is an element constituting a computer of the image forming apparatus 1. The processing circuit 111 includes a processor such as a central processing unit (CPU). The processing circuit 111 may include an application specific integrated circuit (ASIC), a field programmable gate array (FPGA), or a graphics processing unit (GPU) in addition to the CPU or instead of the CPU. The processing circuit 111 loads a program pre-stored in the main memory 112 or the auxiliary storage device 113 into the main memory 112. The processing circuit 111 executes various processes by executing the programs loaded on the main memory 112.

The main memory 112 corresponds to a main memory portion of the image forming apparatus 1. The main memory 112 is an element constituting a computer of the image forming apparatus 1. The main memory 112 includes a non-volatile memory area and a volatile memory area. The main memory 112 stores an operating system or programs in the non-volatile memory area. The main memory 112 uses the volatile memory area as a work area in which data is appropriately rewritten by the processing circuit 111. For example, the main memory 112 includes a read only memory (ROM) as a non-volatile memory area. For example, the main memory 112 includes a random access memory (RAM) as the volatile memory area.

The auxiliary storage device 113 corresponds to an auxiliary storage portion of the image forming apparatus 1. For example, the auxiliary storage device 113 includes a hard disk drive (HDD). The auxiliary storage device 113 may include a semiconductor storage medium such as a solid state drive (SSD) in addition to the HDD or instead of the HDD. The auxiliary storage device 113 stores the above-described programs, data used if the processing circuit 111 performs various processes, and data generated by the processes of the processing circuit 111. The auxiliary storage device 113 is an example of the storage device.

The auxiliary storage device 113 stores a uniform resource locator (URL) of the page related to the error. The auxiliary storage device 113 stores information about an installation area of the image forming apparatus 1. Hereinafter, the information about the installation area of the image forming apparatus 1 is also referred to as area information of the image forming apparatus 1. The area information of the image forming apparatus 1 is information indicating the area or location (e.g., address, building, floor, room, etc.) in which the image forming apparatus 1 is installed. For example, the area is an address. The area information of the image forming apparatus 1 can be appropriately set by the user. The auxiliary storage device 113 stores a plurality of error codes. Each error code is a code for identifying each error that may occur in the image forming apparatus 1.

The control panel 12 includes a display device 121 and an input device 122. The display device 121 is a device that can display the images. The display device 121 is, but is not limited to, a liquid crystal display, an organic electroluminescence (EL) display, or the like. The input device 122 is a device that can receive input of the instructions based on user operations. The input device 122 may include pressable buttons. The input device 122 may include a touch panel integrated with the display device 121.

The scanner unit 13 is a device that reads images such as characters, figures, and pictures drawn on a sheet placed at a predetermined position. The scanner unit 13 includes a line sensor. The line sensor may be a charge coupled device (CCD) system. The line sensor may be of a contact image sensor (CIS) type. The scanner unit 13 generates image data based on the image read by using the line sensor. The scanner unit 13 transmits the generated image data to the control unit 11. The control unit 11 stores the received image data in the auxiliary storage device 113 and transmits the data to the printer unit 17.

The communication circuit 14 is an interface for communicably connecting the image forming apparatus 1 and another apparatus such as a personal computer (PC) via a wired or wireless network.

The input/output interface 15 is an interface for connecting the image forming apparatus 1 and an external apparatus. The input/output interface 15 includes a wired cable connector.

The voice output device 16 is a device that can output voice under the control of the processing circuit 111. For example, the voice output device 16 is a speaker.

The printer unit 17 is a unit that forms an image on a sheet. The printer unit 17 forms the image on the sheet based on image data transmitted from another apparatus via the communication circuit 14 by using the print function. The printer unit 17 forms the image on the sheet based on image data generated by the scanner unit 13 by using a copy function. Herein, an example of the printer unit 17 using a tandem-type toner image transfer unit will be described. The printer unit 17 includes an accommodation unit 171, a conveying unit 172, an image forming unit 173, and a fixing device 174.

The accommodation unit 171 accommodates sheets. The accommodation unit 171 includes a paper feed cassette and a pickup roller. The paper feed cassette accommodates the sheets. The pickup roller picks up the sheets one by one from the paper feed cassette. The pickup roller supplies the picked sheets to the conveying unit 172.

The conveying unit 172 conveys the sheets in the printer unit 17. The conveying unit 172 includes a plurality of rollers and registration rollers. The plurality of rollers include rollers that convey the sheets fed by the pickup roller to the registration rollers. The plurality of rollers include rollers provided downstream of the fixing device 174 described later for discharging the sheets to the discharge tray. The registration rollers convey the sheets to the transfer unit in accordance with the timing at which the transfer unit of the image forming unit 173 described later transfers the toner image to the sheet.

The Image forming unit 173 forms a toner image on the sheet. The image forming unit 173 includes an intermediate transfer belt, a plurality of developing units, an exposure device, a transfer unit, and the like. The intermediate transfer belt is an endless belt. The plurality of developing units correspond to the number of types of toner. The plurality of developing units include a black developing unit, a cyan developing unit, a magenta developing unit, and a yellow developing unit. Each developing unit includes a photoreceptor drum. Each developing unit includes a charger, a developing device, a primary transfer roller, a cleaning unit, and a neutralization device around the photoreceptor drum. The photoreceptor drum is a drum having a photoreceptor layer on the surface. The charger uniformly charges the photoreceptor layer on the surface of the photoreceptor drum. The developing device develops an electrostatic latent image on the surface of the photoreceptor drum with toner. The developing device forms a toner image on the surface of the photoreceptor drum. The primary transfer roller faces the photoreceptor drum and interposes the intermediate transfer belt. The primary transfer roller transfers the toner image on the surface of the photoreceptor drum to the intermediate transfer belt. The cleaning unit removes untransferred toner on the surface of the photoreceptor drum. The neutralization device irradiates the surface of the photoreceptor drum with light. The neutralization device neutralizes the photoreceptor layer of the photoreceptor drum by light irradiation. The exposure device irradiates the surface of the photoreceptor drum of each developing unit with a laser beam via an optical system such as a polygon mirror. The exposure device forms an electrostatic pattern as the electrostatic latent image on the surface of the photoreceptor drum. The transfer unit transfers the charged toner image on the surface of the intermediate transfer belt to the sheet. The transfer unit includes a support roller and a secondary transfer roller configured to interpose the intermediate transfer belt and the sheet from both sides in the thickness direction.

The fixing device 174 applies heat and pressure to the sheet supplied from the image forming unit 173, on which the toner image is formed. The fixing device 174 fixes the toner image formed on the sheet to the sheet by heat and pressure.

It is noted that the hardware configuration of the image forming apparatus 1 is not limited to the configuration described above. The image forming apparatus 1 can allow omission and modification of the above-described components and addition of new components as appropriate.

Figure 3:
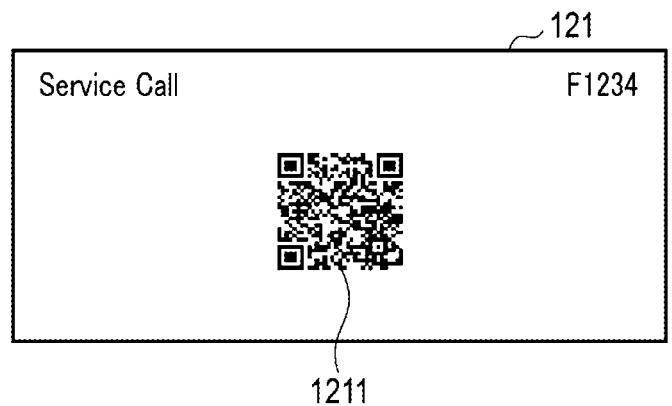
FIG. 3 is a diagram illustrating a display example in the image forming apparatus.

The display example in the image forming apparatus 1 will be described. FIG. 3 is a diagram illustrating a display example in the image forming apparatus 1. The display device 121 displays an error screen. The error screen is an image for supporting the coping measures to address the error in the image forming apparatus 1. The display device 121 displays the error screen based on the detection of the error by the processing circuit 111.

The display device 121 displays a two-dimensional code symbol 1211 on the error screen based on the detection of the error by the processing circuit 111. The display device 121 displays the two-dimensional code symbol 1211 in a state of being readable by the mobile terminal 2. For example, the two-dimensional code symbol 1211 is a QR code (registered trademark) symbol, but the embodiment is not limited thereto. The two-dimensional code symbol 1211 is an example of the code symbol capable of recording information. The two-dimensional code symbol 1211 is a code symbol in which the URL of the page related to the error, the error code indicating the error in the image forming apparatus 1, and the area information of the image forming apparatus 1 are recorded. Hereinafter, the error code indicating the error in the image forming apparatus 1 is also referred to as the error code of the image forming apparatus 1. It is noted that the two-dimensional code symbol 1211 may be any code symbol that records at least the URL of the page related to the error. The two-dimensional code symbol 1211 may not record one or both of the error code of the image forming apparatus 1 and the area information of the image forming apparatus 1.

The display device 121 can display the error code on the error screen based on the detection of the error by the processing circuit 111. In FIG. 3, the display device 121 displays the error code on the upper right of the error screen.

Figure 4:
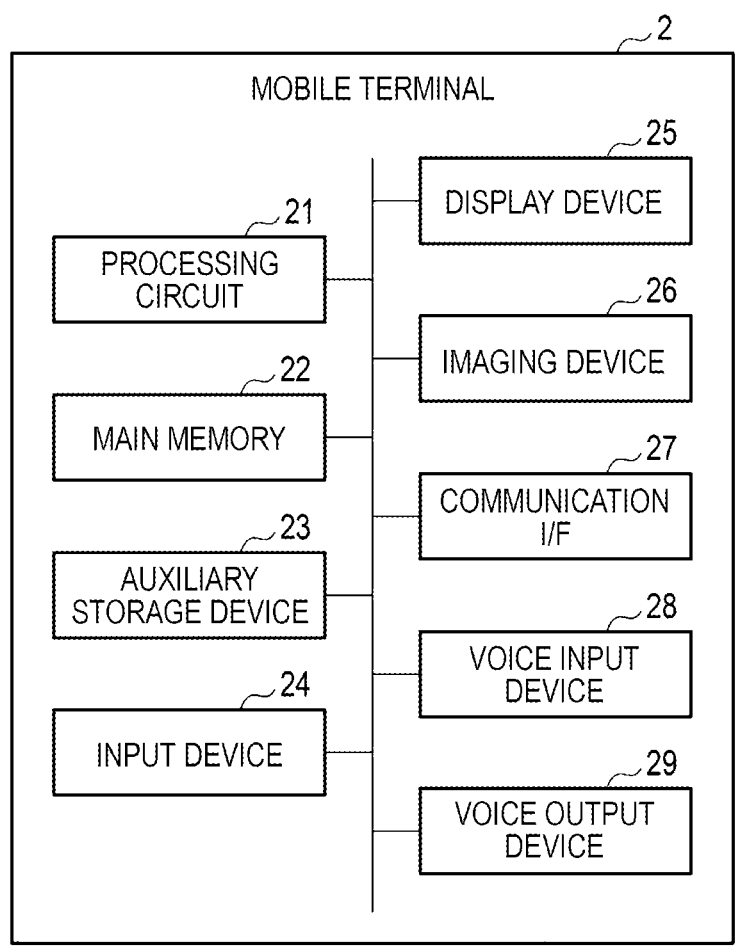
FIG. 4 is a block diagram schematically illustrating a configuration example of a mobile terminal.

A configuration example of the mobile terminal 2 will be described. FIG. 4 is a block diagram schematically illustrating the configuration example of the mobile terminal 2. The mobile terminal 2 includes a processing circuit 21, a main memory 22, an auxiliary storage device 23, an input device 24, a display device 25, an imaging device 26, a communication interface 27, a voice input device 28, and a voice output device 29. In FIG. 4, the interface is denoted by "I/F".

The processing circuit 21 corresponds to a central portion of the mobile terminal 2. The processing circuit 21 is an element constituting a computer of the mobile terminal 2. The processing circuit 21 may have the same hardware configuration as the processing circuit 111. The processing circuit 21 loads a program pre-stored in the main memory 22 or the auxiliary storage device 23 into the main memory 22. The processing circuit 21 executes various processes by executing the programs loaded in the main memory 22.

The main memory 22 corresponds to a main memory portion of the mobile terminal 2. The main memory 22 is an element constituting a computer of the mobile terminal 2. The main memory 22 may have the same hardware configuration as the main memory 112.

The auxiliary storage device 23 corresponds to an auxiliary storage portion of the mobile terminal 2. The auxiliary storage device 23 may have the same hardware configuration as the auxiliary storage device 113.

The input device 24 is a device that can receive input of instructions based on user operations. The input device 24 may include pressable buttons. The input device 24 may include a touch panel integrated with the display device 25.

The display device 25 is a device that can display various images. The display device 25 may have the same hardware configuration as the display device 121.

The imaging device 26 is a device that can obtain image data by imaging. For example, the imaging device 26 is a camera.

The communication interface 27 is an interface for communicably connecting the mobile terminal 2 to the server 3 via the network NW.

The voice input device 28 is a device that can receive input of voice. For example, voice input device 28 is a microphone. The voice input device 28 can be used to contact the service center by phone.

The voice output device 29 is a device that can output voice. For example, the voice output device 29 is a speaker. The voice output device 29 can be used for the contact by phone to the service center.

It is noted that the hardware configuration of the mobile terminal 2 is not limited to the configuration described above. The mobile terminal 2 allows omission and modification of the above-described components and addition of new components as appropriate.

Figure 5:
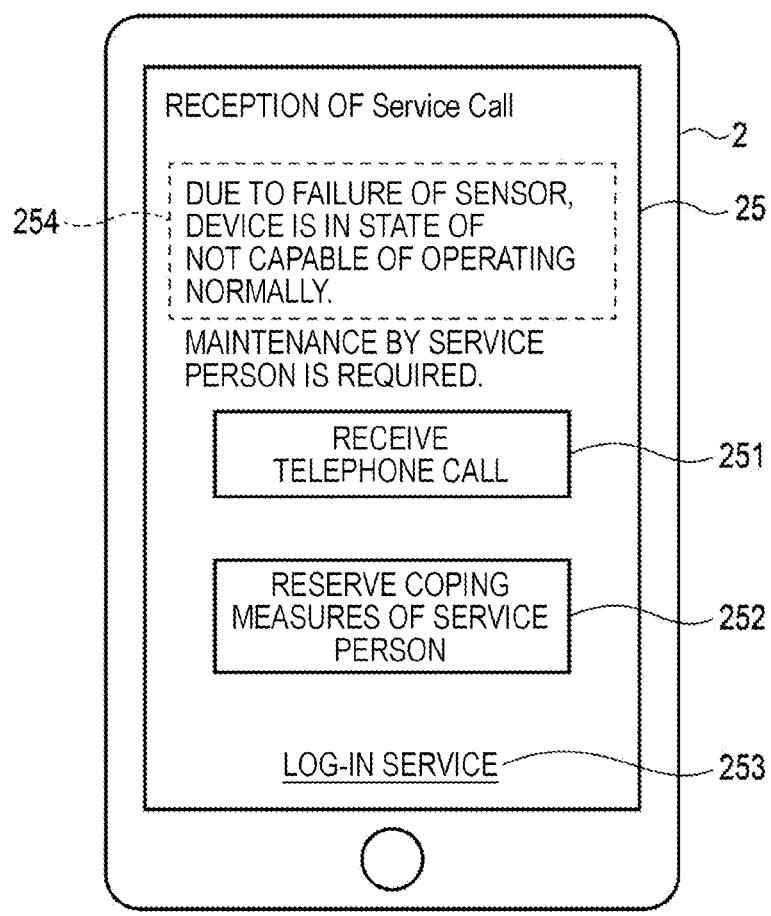
FIG. 5 is a diagram illustrating a display example in the mobile terminal.

A display example in the mobile terminal 2 will be described. FIG. 5 is a diagram illustrating the display example in the mobile terminal 2. The display device 25 displays the page related to the error. The page related to the error is displayed based on display data of the page related to the error obtained from the server 3 by the mobile terminal 2.

The page related to the error includes a phone selection key 251 as display of the service for the contact by phone. The phone selection key 251 is a key for realizing the contact by phone to the service center by the mobile terminal 2. The mobile terminal 2 executes a process of making a call to the phone number of the service center based on input of the selection instruction of the phone selection key 251 via the input device 24 by the user. The mobile terminal 2 may obtain the phone number of the service center from the server 3 together with the display data of the page related to the error. The mobile terminal 2 may obtain the phone number of the service center from the server 3 based on the input of the selection instruction of the phone selection key 251. It is noted that the server 3 can select the phone number of the service center based on the area information of the image forming apparatus 1 obtained from the mobile terminal 2. In this case, the phone number of the service center differs depending on the area information of the image forming apparatus 1.

The page related to the error includes an e-mail selection key 252 as a display of the service for the contact by e-mail. The e-mail selection key 252 is a key for enabling the mobile terminal 2 to perform the contact by e-mail to the service center. The mobile terminal 2 displays a message creation page for the contact by e-mail on the display device 25 based on the input of the selection instruction of the e-mail selection key 252 via the input device 24 by the user. The message creation page is a page for creating a message to be transmitted to the e-mail address of the service center. For example, the message creation page includes an input field for an address of the user and an input field for a message requesting the coping measures of the service person to the service center. It is noted that the server 3 can select the e-mail address of the service center based on the area information of the image forming apparatus 1 obtained from the mobile terminal 2. In this case, the e-mail address of the service center differs depending on the area information of the image forming apparatus 1.

The page related to the error includes an electronic manual browsing selection key 253 as a service display for browsing of the electronic manual. The electronic manual browsing selection key 253 is a key for realizing the browsing of the electronic manual on the mobile terminal 2. The mobile terminal 2 displays the log-in page of the electronic manual on the display device 25 based on the input of the selection instruction of the electronic manual browsing selection key 253 via the input device 24 by the user. The mobile terminal 2 displays the electronic manual on the display device 25 based on the authentication of the log-in information input on the log-in page of the electronic manual. The log-in information may include an ID and a password. For example, authentication of the log-in information is success in the log-in. It is noted that the server 3 can select a predetermined page from the electronic manual based on the error code of the image forming apparatus 1 obtained from the mobile terminal 2. The predetermined page in the electronic manual is a page corresponding to the error code of the image forming apparatus 1. The page corresponding to the error code of the image forming apparatus 1 is a page describing the coping measures to the error in the image forming apparatus 1. The server 3 outputs the display data of the predetermined page in the electronic manual to the mobile terminal 2 based on the authentication of the log-in information. The mobile terminal 2 displays the predetermined page in the electronic manual on the display device 25 based on the authentication of the log-in information.

The page related to the error includes a display area 254 of an error content. The display area 254 includes a message of the error content corresponding to the error code of the image forming apparatus 1. In this example, the server 3 can select the message of the error content based on the error code of the image forming apparatus 1 obtained from the mobile terminal 2. The server 3 outputs the display data of the page related to the error including the message of the error content to the mobile terminal 2.

Figure 6:
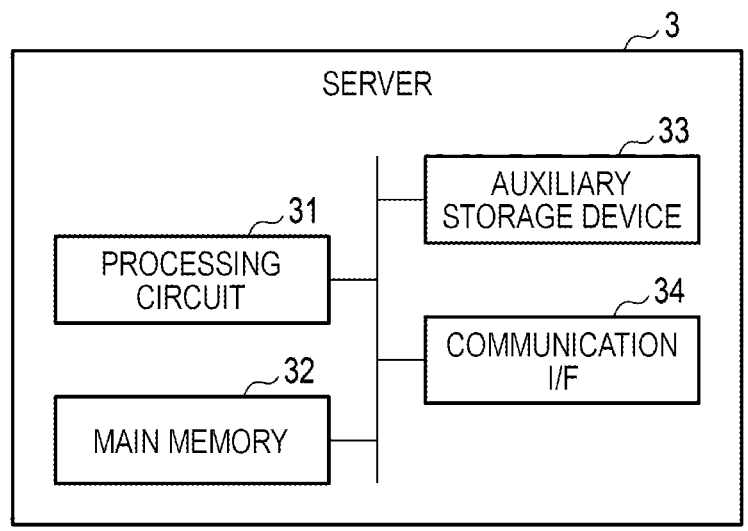
FIG. 6 is a block diagram schematically illustrating a configuration example of a server.

A configuration example of the server 3 will be described. FIG. 6 is a block diagram schematically illustrating the configuration example of the server 3. The server 3 includes a processing circuit 31, a main memory 32, an auxiliary storage device 33, and a communication interface 34. In FIG. 6, the interface is denoted by "I/F".

The processing circuit 31 corresponds to a central portion of the server 3. The processing circuit 31 is an element constituting a computer of the server 3. The processing circuit 31 may have the same hardware configuration as the processing circuit 111. The processing circuit 31 loads programs pre-stored in the main memory 32 or the auxiliary storage device 33 into the main memory 32. The processing circuit 31 executes various processes by executing the programs loaded into the main memory 32.

The main memory 32 corresponds to a main memory portion of the server 3. The main memory 32 is an element constituting a computer of the server 3. The main memory 32 may have the same hardware configuration as the main memory 112.

The auxiliary storage device 33 corresponds to an auxiliary storage portion of the server 3. The auxiliary storage device 33 may have the same hardware configuration as the auxiliary storage device 113. The auxiliary storage device 33 is an example of the storage device.

The auxiliary storage device 33 stores the display data of the page for the image forming apparatus 1. The auxiliary storage device 33 stores phone numbers of the plurality of service centers. Each of the phone numbers of the plurality of service centers is associated with an area of a person in charge of each service center. The auxiliary storage device 33 stores e-mail addresses of the plurality of service centers. Each of the e-mail addresses of the plurality of service centers is associated with an area of a person in charge of each service center. The auxiliary storage device 33 stores the electronic manual related to the image forming apparatus 1. The electronic manual includes the pages describing the coping measures to the error that may occur in the image forming apparatus 1. The auxiliary storage device 33 stores the plurality of messages of the error content. Each of the plurality of messages of the error content is associated with each of the plurality of error codes.

The communication interface 34 is an interface for communicably connecting the server 3 to the mobile terminal 2 via the network NW.

It is noted that the hardware configuration of the server 3 is not limited to the configuration described above. The server 3 allows omission and modification of the above-described components and addition of new components as appropriate.

Next, the processes by the processing circuit 111 of the image forming apparatus 1, the processing circuit 21 of the mobile terminal 2, and the processing circuit 31 of the server 3 configured as described above will be described. It is noted that the process procedure described below is merely an example, and each process may be changed as much as possible. In addition, with respect to the process procedure described below, steps can be omitted, replaced, and added as appropriate according to the embodiment.

Figure 7:
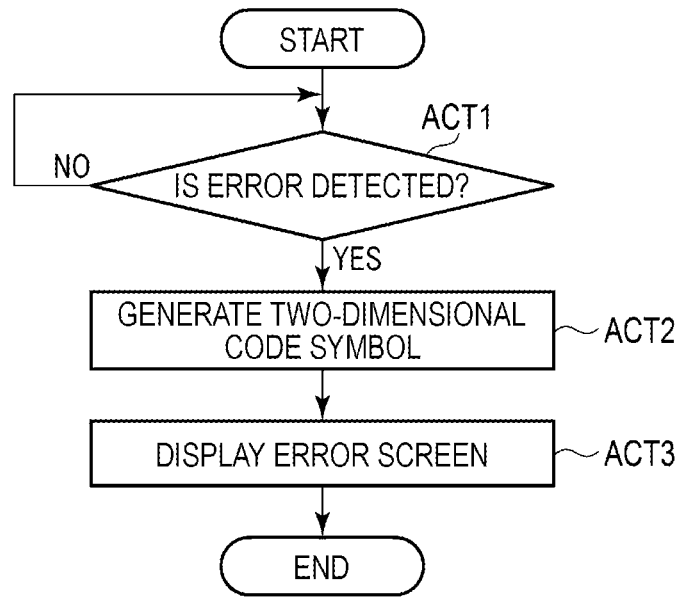
FIG. 7 is a flowchart illustrating an example of processing by the image forming apparatus.

The processes by the processing circuit 111 of the image forming apparatus 1 will be described. FIG. 7 is a flowchart illustrating an example of the processes by the image forming apparatus 1.

The processing circuit 111 detects the error in the image forming apparatus 1 (ACT1). In ACT1, for example, the processing circuit 111 may detect the error in the image forming apparatus 1 by using various sensors of the image forming apparatus 1. If the processing circuit 111 does not detect an error (ACT1, NO), the processing circuit 111 continues to perform the process of ACT1. If the processing circuit 111 detects an error (ACT1, YES), the process transitions from ACT1 to ACT2.

The processing circuit 111 generates the two-dimensional code symbol based on detection of the error in the image forming apparatus 1 (ACT2). In ACT2, for example, the processing circuit 111 obtains the URL of the page related to the error from the auxiliary storage device 113. The processing circuit 111 obtains the error code of the image forming apparatus 1 from the auxiliary storage device 113. The processing circuit 111 obtains the area information of the image forming apparatus 1 from the auxiliary storage device 113. The processing circuit 111 generates the two-dimensional code symbol based on the obtained URL of the page related to the error, the error code of the image forming apparatus 1, and the area information of the image forming apparatus 1. It is noted that, since the error code differs depending on the error in the image forming apparatus 1, the information recorded in the two-dimensional code symbol differs depending on the error code. For this reason, the appearance of the two-dimensional code symbol differs depending on the error code recorded in the two-dimensional code symbol.

The processing circuit 111 displays the error screen on the display device 121 based on the generation of the two-dimensional code symbol (ACT3). The display device 121 can display the error screen by the processes of the processing circuit 111. The being based on the generation of the two-dimensional code symbol is an example of being based on detection of the error in the image forming apparatus 1. The displaying the error screen is an example of the displaying the two-dimensional code symbol. The displaying the error screen is an example of the displaying the error code of the image forming apparatus 1.

As described above, the display device 121 can display the two-dimensional code symbol that records the URL of the page related to the error. Accordingly, the image forming apparatus 1 can support the user or the service person in imaging or capturing the two-dimensional code symbol using the mobile terminal 2 and easily accessing the page related to the error. For this reason, the image forming apparatus 1 can simplify the coping measures by one or both of the user and the service person to eliminate the error.

As described above, the two-dimensional code symbol may be a code symbol in which the error code is recorded. Accordingly, the image forming apparatus 1 can support the mobile terminal 2 in outputting the error code to the server 3. For this reason, the image forming apparatus 1 can support the server 3 in providing the user or the service person with the service corresponding to the error code.

As described above, the two-dimensional code symbol may be a code symbol in which the area information of the image forming apparatus 1 is recorded. Accordingly, the image forming apparatus 1 can support the mobile terminal 2 to output the area information to the server 3. For this reason, the image forming apparatus 1 can support the server 3 in providing the user or the service person with a service according to the area information.

As described above, the processing circuit 21 may generate the two-dimensional code symbol based on detection of the error. Accordingly, the image forming apparatus 1 can generate the two-dimensional code symbol in which the error code corresponding to the detected error is recorded for each detection of the error. For this reason, the image forming apparatus 1 can support one or both of the user and the service person in coping with the error regardless of the detected error.

As described above, the one or more services related to the error may include the service for the contact by phone. Accordingly, the image forming apparatus 1 can support the user in making a call to the phone number of the service center by using the mobile terminal 2 with which the user images the two-dimensional code symbol. For this reason, the image forming apparatus 1 can support the user in coping with the error.

As described above, the one or more services related to the error may include the service for the contact by e-mail. Accordingly, the image forming apparatus 1 can support the user in transmitting the e-mail to the service center by using the mobile terminal 2 on which the two-dimensional code symbol is imaged. For this reason, the image forming apparatus 1 can support the user in coping with the error.

As described above, the one or more services related to the error may include the service for browsing of the electronic manual. Accordingly, the image forming apparatus 1 can support the service person in browsing the electronic manual by using the mobile terminal 2 on which the two-dimensional code symbol is imaged. For this reason, the image forming apparatus 1 can support the service person in coping with the error. Furthermore, as described above, if the two-dimensional code symbol records the error code, the image forming apparatus 1 can support the server 3 in providing the predetermined page corresponding to the error code to the service person. For this reason, the service person can image the two-dimensional code symbol by using the mobile terminal 2 and, immediately after that, can browse the corresponding page in the electronic manual.

As described above, the display device 121 can display the error code. Accordingly, the image forming apparatus 1 can support the user in confirming the error code when making a call to the phone number of the service center by using the mobile terminal 2. For this reason, the image forming apparatus 1 can support the user in coping with the error.

As described above, the one or more services related to the error can include one or more services for the coping measures of the user regarding with the image forming apparatus 1 to the error and one or more services for the coping measures of the service person to the error. Accordingly, the image forming apparatus 1 can share the two-dimensional code symbol for the user to cope with the error and the two-dimensional code symbol for the service person to cope with the error. For this reason, it is sufficient for the image forming apparatus 1 to display the one two-dimensional code symbol on the display device 121, so that the display area of the display device 121 can be effectively utilized.

Figure 8:
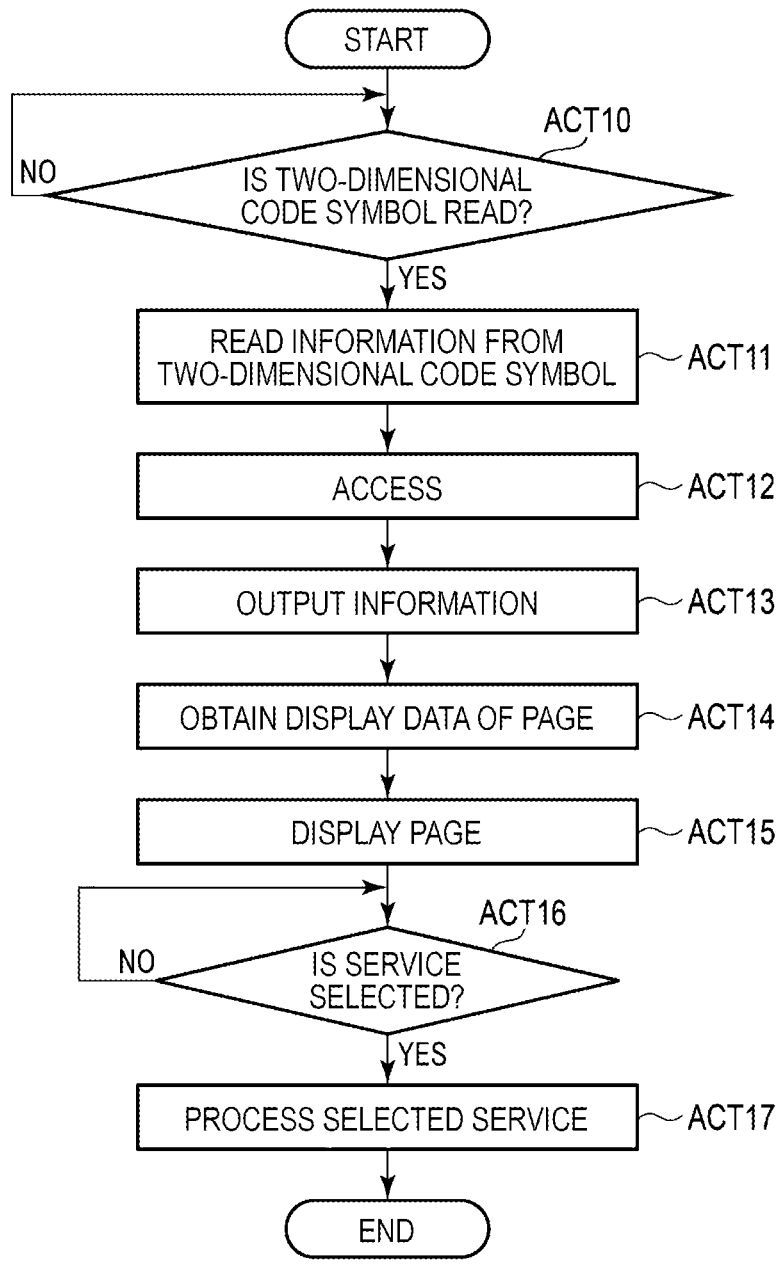
FIG. 8 is a flowchart illustrating an example of processing by the mobile terminal.

The processes by the processing circuit 21 of the mobile terminal 2 will be described. FIG. 8 is a flowchart illustrating an example of the processes by the mobile terminal 2.

It is noted that, if the service person uses the mobile terminal 2, in the following description of FIG. 8, the notation of "user" can be replaced with and read as the "service person".

The processing circuit 21 reads the two-dimensional code symbol imaged or captured by the imaging device 26 (ACT10). In ACT10, for example, the imaging device 26 images the two-dimensional code symbol displayed on the display device 121 of the image forming apparatus 1. The processing circuit 21 reads the two-dimensional code symbol from the image-formed image based on the imaging of the two-dimensional code symbol by the imaging device 26. If the processing circuit 21 does not read the two-dimensional code symbol (ACT10, NO), the processing circuit 21 continues to perform the process of ACT10. If the processing circuit 21 reads the two-dimensional code symbol (ACT10, YES), the process transitions from ACT10 to ACT11.

The processing circuit 21 reads information recorded in the two-dimensional code symbol from the read two-dimensional code symbol (ACT11). In ACT11, for example, the processing circuit 21 reads the URL of the page related to the error, the error code of the image forming apparatus 1, and the area information of the image forming apparatus 1 from the read two-dimensional code symbol.

The processing circuit 21 accesses the URL of the page related to the error read by the processing circuit 21 through communication between the mobile terminal 2 and the server 3 (ACT12). The processing circuit 21 may automatically access the URL of the page related to the error based on reading the URL of the page related to the error. The processing circuit 21 may access the URL of the page related to the error based on the input of an access instruction by the user after reading the URL of the page related to the error. The communication interface 27 can access the URL of the page related to the error read by the processing circuit 21 through the processes of the processing circuit 21.

The processing circuit 21 outputs the error code of the image forming apparatus 1 and the area information of the image forming apparatus 1 to the server 3 based on the access to the URL of the page related to the error (ACT13).

The processing circuit 21 obtains the display data of the page related to the error from the server 3 (ACT14).

The processing circuit 21 displays the page related to the error on the display device 25 based on the obtained display data of the page related to the error (ACT15).

The processing circuit 21 waits for the input of the selection instruction of the service via the input device 24 by the user (ACT16). The selection instruction of the service is an instruction to select one service from the one or more services included in the page related to the error. If the selection instruction of the service is not input by the user via the input device 24 (ACT16, NO), the processing circuit 21 continues to perform the process of ACT16. If the selection instruction of the service is input by the user via the input device 24 (ACT16, YES), the processing circuit 21 outputs the input selection instruction of the service to the server 3. The process transitions from ACT16 to ACT17.

The processing circuit 21 processes the selected service based on the input of the selection instruction of the service via the input device 24 by the user (ACT17).

The case where the user selects the service for the contact by phone will be described. The processing circuit 21 processes the service for the contact by phone based on the input of the selection instruction of the phone selection key 251 via the input device 24 by the user. In this example, the processing circuit 21 performs a process of making a call to the phone number of the service center obtained from the server 3.

The case where the user selects a service for contact by e-mail will be described. The processing circuit 21 processes the service for the contact by e-mail based on the input of the selection instruction of the e-mail selection key 252 via the input device 24 by the user. In this example, the processing circuit 21 displays the message creation page on the display device 25 based on the display data of the message creation page obtained from the server 3. The processing circuit 21 outputs the information input on the message creation page to the server 3 based on the input of the transmission instruction of the message via the input device 24 by the user.

The case where the service person selects the service for browsing of the electronic manual will be described. The processing circuit 21 processes the service for browsing of the electronic manual based on the input of the selection instruction of the electronic manual browsing selection key 253 via the input device 24 by the service person. In this example, the processing circuit 21 obtains the display data of the log-in page from the server 3 based on the input of the selection instruction of the electronic manual browsing selection key 253 via the input device 24 by the user. The processing circuit 21 displays the log-in page on the display device 25 based on the display data of the log-in page obtained from the server 3. The processing circuit 21 outputs the log-in information to the server 3 based on the input of the log-in information via the input device 24 by the user. The processing circuit 21 obtains the display data of the predetermined page in the electronic manual from the server 3 based on authentication of the log-in information by the server 3. The processing circuit 21 displays the predetermined page of the electronic manual on the display device 25 based on the display data of the predetermined page of the electronic manual obtained from the server 3.

It is noted that, in the description that the processing circuit 21 outputs the information, instructions, or the like to the server 3, the notation of "processing circuit 21" can be replaced with and read as the "communication interface 27". The processing circuit 21 outputting the information, instructions, or the like to the server 3 includes the processing circuit 21 transmitting the information, instructions, or the like to the server 3. In the description that the processing circuit 21 obtains the information, data, or the like from the server 3, the notation of "processing circuit 21" can be replaced with and read as the "communication interface 27". The processing circuit 21 obtaining the information, data, or the like from the server 3 includes the processing circuit 21 receiving the information, data, or the like from the server 3. In the description that the processing circuit 21 displays an image such as a page on the display device 25, the notation of "processing circuit 21" can be replaced with and read as the "display device 25".

Figure 9:
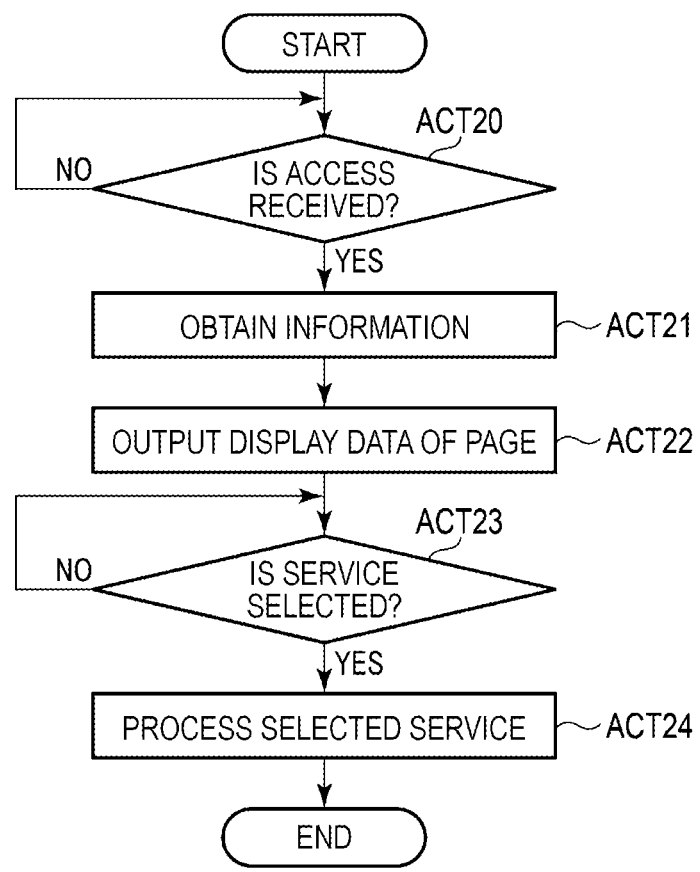
FIG. 9 is a flowchart illustrating an example of processing by the server.

The processes by the processing circuit 31 of the server 3 will be described. FIG. 9 is a flowchart illustrating an example of the processes by the server 3.

The processing circuit 31 receives access to the URL of the page related to the error by the mobile terminal 2 through communication between the server 3 and the mobile terminal 2 (ACT20).

The processing circuit 31 obtains the error code of the image forming apparatus 1 and the area information of the image forming apparatus 1 from the mobile terminal 2 based on the access to the URL of the page related to the error by the mobile terminal 2 (ACT21).

The processing circuit 31 outputs the display data of the page related to the error to the mobile terminal 2 based on the access to the URL of the page related to the error by the mobile terminal 2 (ACT22). In ACT22, for example, the processing circuit 31 obtains the message of the error content corresponding to the error code from the auxiliary storage device 33 based on the obtained error code of the image forming apparatus 1. The processing circuit 31 generates the display data of the page related to the error including the obtained message of the error content. The processing circuit 31 outputs the display data of the page related to the error to the mobile terminal 2.

The processing circuit 31 waits for the selection instruction of the service from the mobile terminal 2 (ACT23). If the processing circuit 31 does not obtain the selection instruction of the service from the mobile terminal 2 (ACT23, NO), the processing circuit 31 continues to perform the process of ACT23. If the processing circuit 31 obtains the selection instruction of the service from the mobile terminal 2 (ACT23, YES), the process transitions from ACT23 to ACT24.

The processing circuit 31 processes the selected service based on the selection instruction of the service from the mobile terminal 2 (ACT24).

The case where the user selects the service for the contact by phone will be described. The processing circuit 31 obtains the selection instruction of the service for the contact by phone from the mobile terminal 2. The processing circuit 31 obtains the phone number of the service center corresponding to the installation area of the image forming apparatus 1 from the auxiliary storage device 33 based on the obtained area information of the image forming apparatus 1. The processing circuit 31 outputs the obtained phone number of the service center to the mobile terminal 2. It is noted that the processing circuit 31 may output the phone number of the service center to the mobile terminal 2 together with the display data of the page related to the error.

The case where the user selects the service for the contact by e-mail will be described. The processing circuit 31 obtains the selection instruction of the service for the contact by e-mail from the mobile terminal 2. The processing circuit 31 obtains the e-mail address of the service center corresponding to the installation area of the image forming apparatus 1 from the auxiliary storage device 33 based on the obtained area information of the image forming apparatus 1. The processing circuit 31 outputs the display data of the message creation page to the mobile terminal 2. The processing circuit 31 obtains the information input on the message creation page from the mobile terminal 2. The processing circuit 31 transmits the information input on the message creation page to the e-mail address of the service center according to the installation area of the image forming apparatus 1.

The case where the service person selects the service for browsing of the electronic manual will be described. The processing circuit 31 obtains the selection instruction of the service for browsing of the electronic manual from the mobile terminal 2. The processing circuit 31 identifies the predetermined page corresponding to the error code of the image forming apparatus 1 in the electronic manual based on the selection instruction of the service for browsing of the electronic manual. The processing circuit 31 outputs the display data of the log-in page to the mobile terminal 2 based on the selection instruction of the service for browsing of the electronic manual. The processing circuit 31 obtains the log-in information input on the log-in page from the mobile terminal 2. The processing circuit 31 outputs the display data of the predetermined page in the electronic manual to the mobile terminal 2 based on the authentication of the log-in information.

It is noted that, in the description that the processing circuit 31 obtains the information, instructions, or the like from the mobile terminal 2, the notation of "processing circuit 31" can be replaced with and read as the "communication interface 34". The obtaining of the information, instructions, or the like by the processing circuit 31 from the mobile terminal 2 includes the receiving of the information, instructions, or the like by the processing circuit 31 from the mobile terminal 2. In the description that the processing circuit 31 outputs the information, data, or the like to the mobile terminal 2, the notation of the "processing circuit 31" can be replaced with and read as the "communication interface 34". The processing circuit 31 outputting the information, data, or the like to the mobile terminal 2 includes the transmitting of the information, data, or the like by the processing circuit 31 to the mobile terminal 2.

The above-described embodiments may be expressed as follows.

[1] An operation device including:
   a processing circuit detecting an error in the operation device; and
   a display device displaying a code symbol recording a URL of a page containing a display of one or more services related to the error based on detection of the error by the processing circuit.

[2] The operation device according to [1], in which the code symbol is a code symbol recording an error code indicating the error.

[3] The operation device according to [2], in which the processing circuit generates the code symbol based on the detection of the error.

[4] The operation device according to [1], in which the code symbol is a code symbol recording information about an installation area of the operation device.

[5] The operation device according to [1], in which the one or more services include a service for contact by phone.

[6] The operation device according to [5], in which the display device displays an error code indicating the error.

[7] The operation device according to [1], in which the one or more services include a service for contact by e-mail.

[8] The operation device according to [1], in which the one or more services include a service for browsing an electronic manual.

[9] The operation device according to [1], in which the one or more services include one or more services for coping measures of a user of the operation device to the error and one or more services for the coping measures of a service person to the error.

[10] A display method including:
detecting an error in an operation device; and
displaying a code symbol recording a URL of a page containing a display of one or more services related to the error on a display device based on detection of the error.

In the above-described embodiments, the image forming apparatus is described as an example of the operation device, but the invention is not limited thereto. The operation device is not limited to devices having the printing function, but may be various devices that perform operations.

The operation device may be a single apparatus that implements each function, or may be configured with a plurality of devices in which each function is distributed. The information processing apparatus may be a single apparatus that implements each function, or may be configured with a plurality of devices in which each function is distributed.

The above-described embodiments may be applied not only to devices, but also to methods performed by the devices. The above-described embodiments may be applied to a program that can allow the computer of the apparatus to perform each function. The above-described embodiments may be applied to recording media that store programs.

The program may be transferred in a state of being stored in the apparatus according to the embodiment, or may be transferred in a state of not being stored in the apparatus. In the latter case, the program may be transferred via a network, or may be transferred in a state of being recorded on a recording medium. The recording medium is a non-transitory tangible medium. The recording medium is a computer-readable medium. The recording medium may be a medium such as a CD-ROM or a memory card which can store a program and is readable by a computer, and the form thereof is not limited.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A system comprising:
a display device; and
a processing circuit configured to:
detect an error in the system; and
control the display device to display a code symbol including a uniform resource locator (URL) for a page that provides a display of one or more services related to the error based on detection of the error, the code symbol including location information about an installation area of the system, and at least one service of the one or more services is provided via the page based on a proximity of the at least one service to the installation area.

2. The system according to claim 1, wherein the code symbol includes an error code indicating the error.

3. The system according to claim 2, wherein the processing circuit is configured to generate the code symbol based on detection of the error.

4. The system according to claim 1, wherein the code symbol includes the URL, an error code indicating the error, and the location information about the installation area of the system.

5. The system according to claim 1, further comprising at least one of a printer or a scanner.

6. The system according to claim 5, further comprising a multifunction peripheral including the printer, the scanner, the display device, and the processing circuit.

7. The system according to claim 1, wherein the one or more services include a service for contact by phone.

8. The system according to claim 7, wherein the display device is configured to display an error code indicating the error proximate the code symbol.

9. The device according to claim 1, wherein the one or more services include a service for contact by email.

10. The system according to claim 1, wherein the one or more services include a service for browsing an electronic manual.

11. The system according to claim 10, wherein the code symbol includes an error code indicating the error, and wherein the error code facilitates identifying a respective page of the electronic manual associated with the error code and automatically providing the respective page to a user accessing the electronic manual.

12. The system according to claim 1, wherein the one or more services include one or more services for coping measures of a user of the system to address the error and one or more services for coping measures of a service person to address the error.

13. The system according to claim 1, wherein the code symbol is a two-dimensional code.

14. The system according to claim 1, wherein the processing circuit is a first processing circuit of a local device, further comprising a server including a second processing circuit configured to:
receive an access request in response to the code symbol being read by a camera of a mobile device;
obtain information based on the access request; and
transmit display data to the mobile device for displaying the page on the mobile device.

15. The system according to claim 14, wherein the page provides a phone selection key, an email selection key, and a log-in selection key, wherein the phone selection facilitates calling a service center, wherein the email selection key facilitates emailing the service center, and wherein the log-in selection key facilitates logging in to access an electronic manual.

16. The system according to claim 15, wherein the location information includes the installation area of the local device, and wherein the second processing circuit is configured to select the service center based on the proximity to the installation area of the local device.

17. The system according to claim 15, wherein the code symbol includes an error code indicating the error, and wherein the error code facilitates identifying a respective page of the electronic manual associated with the error code and automatically providing the respective page to a user accessing the electronic manual.

18. A system comprising:
a first non-transitory computer readable medium having first computer-executable instructions encoded therein, the first computer-executable instructions when executed by a first processor of a multifunction peripheral cause the first processor to:
detect an error in the multifunction peripheral; and
control a display device of the multifunction peripheral to display a code symbol including a uniform resource locator (URL), an error code indicating the error, and location information about a location of the multifunction peripheral; and
a second non-transitory computer readable medium having second computer-executable instructions encoded therein, the second computer-executable instructions when executed by a second processor of a server cause the server to:
obtain service information based on an access request received in response to the code symbol being read by a camera of a mobile device, the service information including a service center selected based on the location; and
transmit display data to the mobile device for displaying a page on the mobile device based on the service information, wherein the page provides a phone selection key, an email selection key, and a log-in selection key, wherein the phone selection key facilitates calling the service center, wherein the email selection key facilitates emailing the service center, and wherein the log-in selection key facilitates logging in to access an electronic manual for the multifunction peripheral.

19. A display method comprising:
detecting an error in an operation device;
determining a location of the operation device; and
displaying a code symbol recording a uniform resource locator (URL) for a page that provides a display of one or more services related to the error on a display device based on detection of the error, at least one service of the one or more services is provided via the page based on the location of the operation device in relation to the at least one service.

* * * * *